(12) United States Patent
Korisch et al.

(10) Patent No.: US 6,957,051 B1
(45) Date of Patent: Oct. 18, 2005

(54) APPARATUS FOR LOCAL REDUCTION OF ELECTROMAGNETIC FIELD USING AN ACTIVE SHIELD AND METHOD THEREOF

(75) Inventors: Ilya A. Korisch, Somerset, NJ (US); Michael Sumetsky, Bridgewater, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 149 days.

(21) Appl. No.: 09/676,703

(22) Filed: Sep. 29, 2000

(51) Int. Cl.$^7$ ............................................. H04B 1/10
(52) U.S. Cl. ..................... 455/107; 455/63.1; 455/300; 455/301; 455/575.5; 343/841
(58) Field of Search ..................... 455/106–107, 455/90, 575, 117, 129, 41.1, 63.1, 575.1, 455/575.5, 90.3, 300–301, 114.2, 296; 343/702, 343/841

(56) References Cited

U.S. PATENT DOCUMENTS

| | | | | |
|---|---|---|---|---|
| 5,697,083 A | * | 12/1997 | Sano .......................... 455/276.1 |
| 5,819,162 A | * | 10/1998 | Spann et al. .............. 455/575.5 |
| 5,826,201 A | * | 10/1998 | Gratias ....................... 455/575.5 |
| 5,907,307 A | * | 5/1999 | Bickert et al. .............. 343/702 |
| 5,995,854 A | * | 11/1999 | Wilson ......................... 455/575 |
| 6,009,311 A | * | 12/1999 | Killion ........................... 455/63 |
| 6,211,671 B1 | * | 4/2001 | Shattil ........................... 324/225 |
| 6,314,277 B1 | * | 11/2001 | Hsu .............................. 455/117 |
| 6,356,773 B1 | * | 3/2002 | Rinot ........................... 455/568 |
| 6,359,216 B1 | * | 3/2002 | Liu ............................ 174/35 R |
| 6,369,772 B1 | * | 4/2002 | Forster ......................... 343/850 |
| 6,564,038 B1 | * | 5/2003 | Bethea et al. ................ 343/702 |
| 6,597,896 B1 | * | 7/2003 | Faessler ....................... 343/702 |
| 6,615,026 B1 | * | 9/2003 | Wong ........................ 455/575.5 |
| 6,681,125 B1 | * | 1/2004 | Woo ........................... 455/556.1 |

* cited by examiner

Primary Examiner—William Trost
Assistant Examiner—Brandon J. Miller
(74) Attorney, Agent, or Firm—Cohen, Pontani, Lieberman & Pavane

(57) ABSTRACT

An apparatus and method for shielding an operator from electromagnetic fields emitted from an antenna in a portable communication device. A plurality of active shields are placed between the operator's earpiece and the antenna to dampen the effects of the electromagentic fields. The active shields are coupled to adjustment circuits which may include variable gain amplifiers and phase couplers to offset the antenna signal.

28 Claims, 2 Drawing Sheets

APPARATUS FOR LOCAL REDUCTION OF ELECTROMAGNETIC FIELD USING AN ACTIVE SHIELD AND METHOD THEREOF

FIELD OF THE INVENTION

The present invention relates to shield devices and more particularly pertains to a shield device which may be used to protect a user from electromagnetic fields emitted by an antenna.

DESCRIPTION OF THE PRIOR ART

In recent years, as the number of wireless devices has grown, so has the concern about harm to the user from electromagnetic radiation. Although the level of electromagnetic radiation emitted by such devices is relatively low, the antenna which emits the radiation is close to the head, and there is also concern that the radiation can have a cumulative effect.

In the past, there have been some attempts to protect the users of wireless devices from such radiation, however, none of those approaches has been entirely satisfactory.

SUMMARY OF THE INVENTION

The present invention includes a method and apparatus for protecting an operator from electromagnetic fields emitted by an antenna.

The present invention further includes an apparatus having an antenna creating an electromagnetic field, and an active shield substantially canceling the effects of the electromagnetic field in a predetermined region.

The present invention further includes a communication apparatus having an antenna creating an electromagnetic field, and a plurality of active shields for canceling the effects of the electromagnetic field in a predetermined region.

The present invention further includes a communication apparatus having an antenna creating an electromagnetic field, and a means for canceling the effects of the electromagnetic field in a predetermined region.

The present invention further includes a method comprising generating an electromagnetic field from an antenna, and canceling the effects of the electromagnetic field in a predetermined region using an active shield.

DETAILED DESCRIPTION

Figure 1:
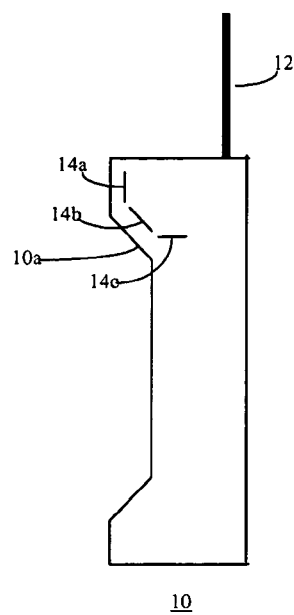
FIG. 1 is a side elevational view of a communication device such as a portable telephone with active shields.

FIG. 1 is a side view of the portable or personal communication apparatus 10 with only a few portions of such apparatus identified. (It should be noted that although the terms personal communication apparatus, wireless communication device, wireless device, wireless telephone are used, these terms are interchangeable and mean any portable device that emits electromagnetic fields, particularly those that are frequently place near a user's head and/or person.) An antenna 12 is shown extending upwardly from the apparatus 10. Active shields or radiators 14a–14c are shown arranged between the antenna 12 and/or the RF circuitry of the device (not shown) and the operator's ear piece 10a. Active shields 14a–14c are radiating devices that substantially cancel or reduce the electromagnetic field(s) from the device 10 and/or the antenna 12 in a predetermined area. In this case the predetermined area is the operator's head which is substantially located near the radiators 14a–14c. The number of active shields may range anywhere from one to five or greater depending on the requirements of the communication apparatus 10. The active shields 14a–14c create a near field which is opposite to that produced by the antenna 12 and the device 10.

Figure 2:
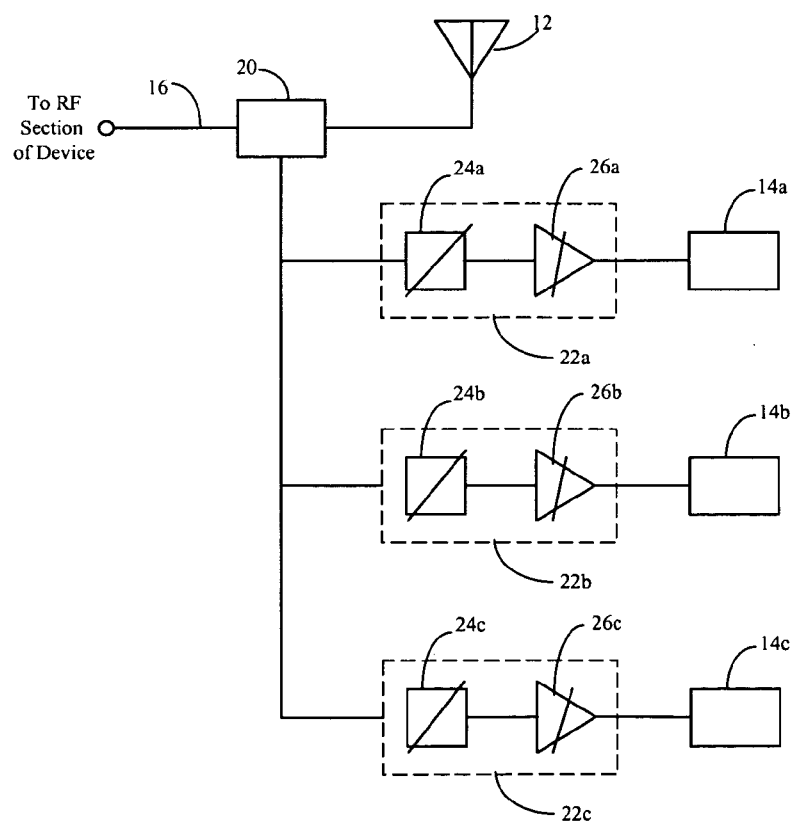
FIG. 2 is a block diagram illustrating the elements of the first embodiment.

FIG. 2 illustrates a block diagram of a first embodiment. Antenna 12 is connected to the RF circuitry section of the device (not shown in FIG. 2) which contains a controller (e.g., microprocessor) through line 16. The controller may be the main controller of the communication device 10 or an extra controller. Located between antenna 12 and the RF circuitry section of the device is a coupler 20. Coupler 20 diverts a small portion of the signal (approximately 10%) traveling from the circuit board to the antenna. In one embodiment, coupler 20 is connected to active shields (or radiators) 14a–14c. Located between coupler 20 and active shields 14a–14c are adjustment circuits 22a–22c. Adjustment circuits 22a–22c each include variable phase shifters 24a–24c and variable gain amplifiers 26a–26c. Variable phase shifters 24a–24c substantially adjust the phase of the signal. As a result, the electromagnetic field strength produced by the antenna which may be absorbed by a user is reduced in effect by the active shields 14a–14c in the region around the earpiece 10a.

Figure 3:
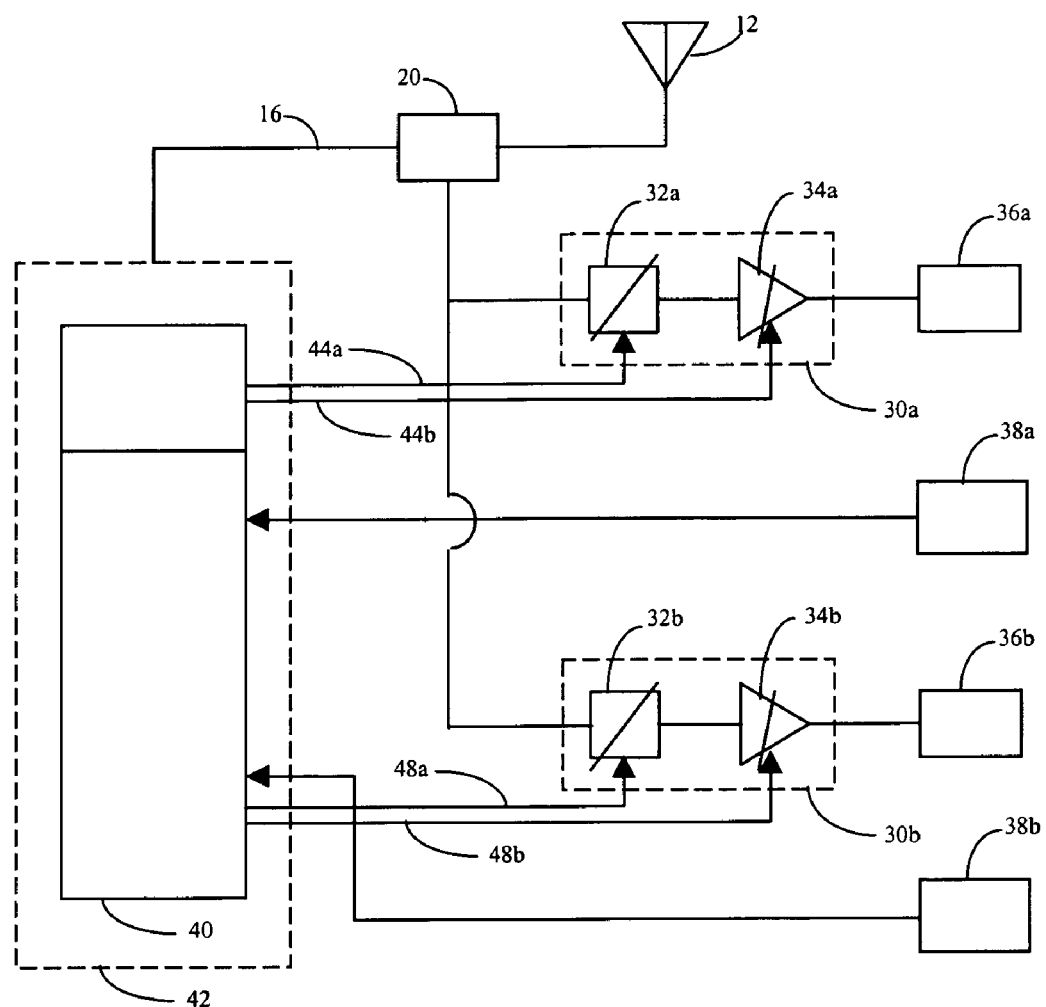
FIG. 3 is a block diagram illustrating the elements of the second embodiment.

FIG. 3 illustrates a block diagram of a second embodiment. Antenna 12 is connected through line 16 to circuit board 42 and controller 40 (e.g., a microprocessor). Coupler 20 is connected to active shields 36a and 36b. Between coupler 20 and active shields 36a–36b are located adjustment circuits 30a and 30b. Adjustment circuits 30a and 30b include variable phase shifters 32a–32b and variable gain amplifiers 34a–34b. The second embodiment further includes sensors 38a and 38b which are located near active shields 36a and 36b, respectively. The sensors measure the electromagnetic field strength in the environment of the shields 36a–36b and send feedback signals along lines 46a and 46b to the controller 40. (The controller 40 may be the main processor for the communication device 10 or it may be a dedicated processor for controlling the active shields 36a–36b). Controller 40 is coupled to the variable phase shifters 32a–32b through lines 44a and 48a. Controller 40 is coupled to the variable gain amplifiers 34a and 34b through lines 44b and 48b. Controller 40 adjusts the variable phase shifters and variable gain amplifiers in response to the readings from the sensors 38a and 38b. Although the second embodiment discloses each active shield with a sensor, in an alternative embodiment there may be one feedback circuit monitoring and controlling a plurality of active shields.

It is understood that the present invention has been described hereinabove by way of example and by preferred embodiments and not as a limitation on the invention. It is to be realized that various changes, alterations, rearrangements and modifications can be made by those skilled in the art to which it relates without departing from the spirit and the scope of the present invention.

What is claimed is:

1. An apparatus comprising a unit for generating an electromagnetic field, said unit comprising:

an RF circuitry portion dimensioned and arranged to generate an antenna signal;

an antenna electrically coupled to said RF circuitry portion, said antenna being dimensioned and arranged to generate an electromagnetic field in response to an antenna signal generated by said RF circuitry portion; and an active shield including a radiation device dimensioned and arranged to generate a near field based on the generated antenna signal for substantially canceling the electromagnetic field in a predetermined region.

2. The apparatus of claim 1, further comprising:
an adjustment circuit coupled between said antenna and said RF circuitry portion.

3. The apparatus of claim 1, further comprising:
a coupler coupled between said RF circuitry portion and said active shield dimensioned and arranged for generating a reduced antenna signal based on the generated antenna signal, said active shield being dimensioned and arranged to generate the near field based on the reduced antenna signal.

4. The apparatus of claim 2, further comprising:
a coupler coupled between said RF circuitry portion and said adjustment circuit dimensioned and arranged for generating a reduced antenna signal based on the generated antenna signal, said active shield being dimensioned and arranged to generate the near field based on the reduced antenna signal.

5. The apparatus of claim 2, wherein said adjustment circuit receives a reduced antenna signal from said RF circuitry portion, said adjustment circuit being operative to output a signal to said active shield to thereby create the near field based on said reduced antenna signal.

6. The apparatus of claim 5, wherein the RF circuitry portion is operative to generate a reduced antenna signal that is approximately ten percent of the generated antenna signal.

7. The apparatus of claim 2, wherein said adjustment circuit includes a phase shifter.

8. The apparatus of claim 2, wherein said adjustment circuit includes a variable gain amplifier.

9. The apparatus of claim 2, wherein said adjustment circuit includes an attenuator.

10. The apparatus of claim 2, further comprising:
a sensor located in proximity to said active shield.

11. The apparatus of claim 2, further comprising:
a feedback circuit for controlling said adjustment circuit, wherein said adjustment circuit is operative to output a signal to said active shield to thereby create the near field based on both the generated antenna signal and said feedback circuit.

12. The apparatus of claim 1, wherein said predetermined region is near an operator's earpiece.

13. A communication apparatus comprising a unit for generating an electromagnetic field, said unit comprising:
an RF circuitry portion dimensioned and arranged to generate an antenna signal;
an antenna electrically coupled to said RF circuitry portion, said antenna being dimensioned and arranged to generate an electromagnetic field in response to an antenna signal generated by said RF circuitry portion; and
a plurality of active shields, each of said plural active shields including a radiation device dimensioned and arranged to generate a near field based on the generated antenna signal for substantially canceling the electromagnetic field in a predetermined region.

14. The communication apparatus of claim 13, further comprising a plurality of adjustment circuits coupled between the RF circuitry portion and said plurality of active shields.

15. The communication apparatus of claim 14, wherein each of said adjustment circuits include a phase shifter and a variable gain amplifier.

16. The communication apparatus of claim 14, further comprising:
a plurality of feedback circuits to control the active shields, wherein said plurality of adjustment circuits are operative to output signals to respective ones of said plurality of active shields to create the near field based on both the generated antenna signal and said plurality of feedback circuits.

17. The communication apparatus of claim 14, wherein said number of active shields is approximately four.

18. A communication apparatus including a unit for generating an electromagnetic field, said unit comprising:
an RF circuitry portion dimensioned and arranged to generate an antenna signal;
an antenna creating an electromagnetic field in response to an antennal signal generated by said RF circuitry portion; and
means for generating a near field for substantially canceling the electromagnetic field in a predetermined region based on the generated antenna signal.

19. A method comprising:
creating an electromagnetic field, by an antenna in a unit of a communication apparatus, in response to an antenna signal generated in the unit; and
generating, by the unit of the communication apparatus, a near field for substantially canceling the electromagnetic field in a predetermined region using an active shield, the near field being generated based on the generated antenna signal.

20. The method of claim 19, wherein the step of generating further comprises:
coupling an RF circuitry portion to an active shield through an adjustment circuit.

21. The method of claim 19, wherein the step of generating further comprises:
phase shifting and amplifying a signal from the antenna before the signal reaches the active shield.

22. The method of claim 21, wherein the step of generating further comprises:
feeding back from a sensor located in proximity to said active shield a signal which is used to vary the phase shifting and amplifying such that the near field is generated based on both the generated antenna signal and the fed back signal.

23. A method comprising:
creating an electromagnetic field, by an antenna in a unit of a communication apparatus, in response to an antenna signal generated in the unit; and
generating, in the unit of the communication apparatus, a near field for substantially canceling the electromagnetic field in a predetermined region using a plurality of active shields, the near field being generated based on the generated antenna signal.

24. An apparatus including a unit for generating an electromagnetic field, the unit comprising:
means for creating an electromagnetic field using an antenna based on an antenna signal generated in the apparatus; and means for generating a near field substantially canceling the electromagnetic field in a predetermined region using an active shield based on the generated antenna signal.

25. The apparatus of claim 24, wherein the generating means further comprises:
   means for coupling an RF circuitry portion to an active shield through an adjustment circuit.

26. The apparatus of claim 25, wherein the generating means further comprises:
   means for phase shifting and amplifying the generated antenna signal before the generated antenna signal reaches the active shield.

27. The apparatus of claim 26, wherein the generating means further comprises:
   means for feeding back from a sensor located in proximity to said active shield a signal which is used to vary the phase shifting and amplifying such that the near field is generated in response to both the generated antenna signal and the fed back signal.

28. An apparatus including a unit for generating an electromagnetic field, the unit comprising:
   means for generating an antenna signal;
   means for creating an electromagnetic field, by an antenna, in response to the generated antenna signal; and
   means for generating a near field substantially canceling the electromagnetic field in a predetermined region using a plurality of active shields based on the generated antenna signal.

* * * * *